May 18, 1971 — W. E. BRADLEY, JR — 3,579,440
SEWAGE TREATMENT SYSTEM
Filed Dec. 4, 1969
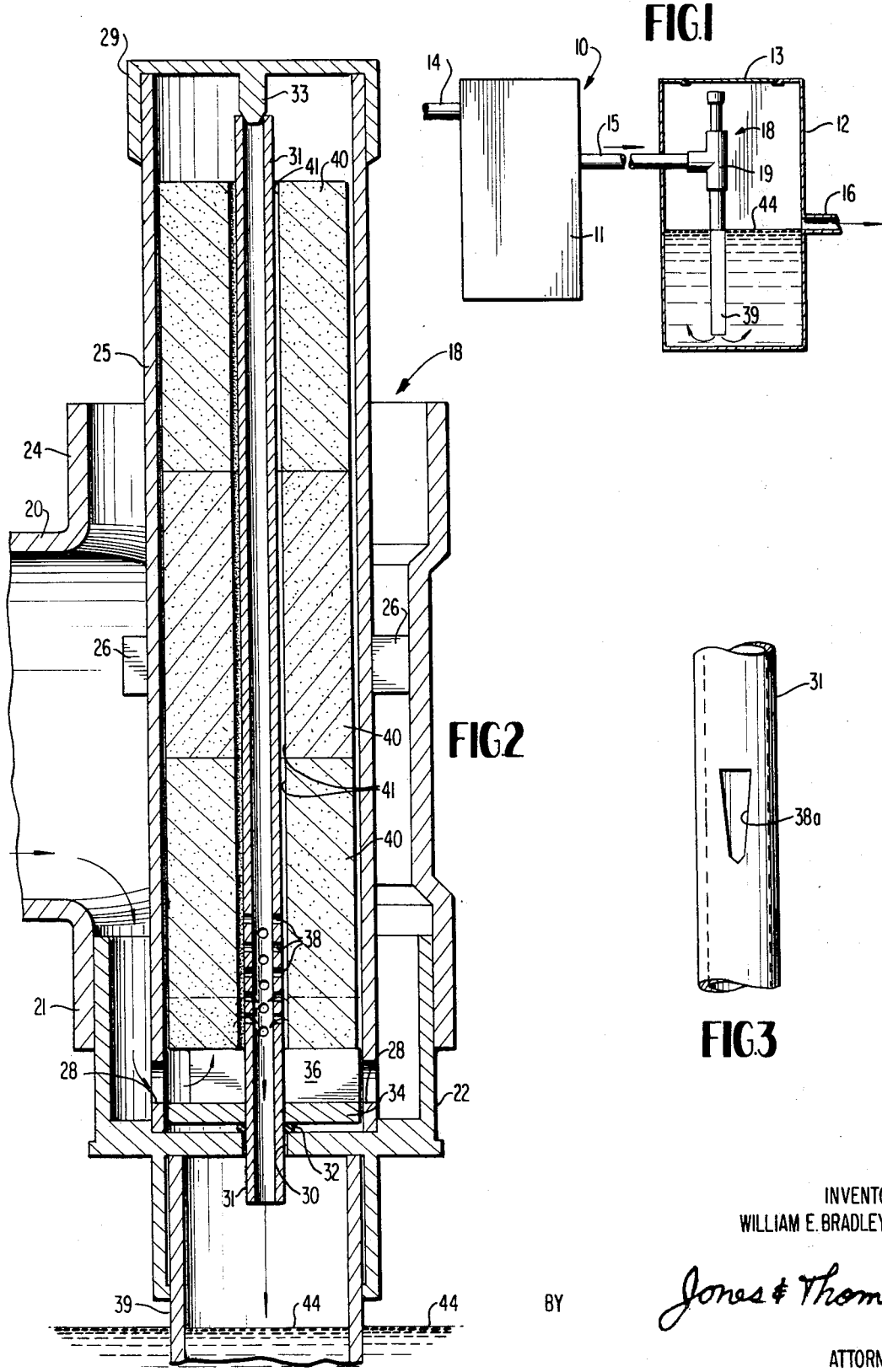
INVENTOR
WILLIAM E. BRADLEY, JR.
Jones & Thomas
ATTORNEYS United States Patent Office 3,579,440
Patented May 18, 1971

3,579,440
SEWAGE TREATMENT SYSTEM
William E. Bradley, Jr., Atlanta, Ga., assignor to
Tesco Chemicals, Inc., Atlanta, Ga.
Filed Dec. 4, 1969, Ser. No. 882,016
Int. Cl. C02b 3/06
U.S. Cl. 210—18
9 Claims

ABSTRACT OF THE DISCLOSURE

Method and apparatus for treating household waste water wherein raw sewage is decomposed with an aerobic process in a septic tank and chlorine is added to the wastewater after it is discharged from the septic tank.

BACKGROUND OF THE INVENTION

The building of houses in developments beyond public sewers or similar sewage disposal systems has required the mass use of septic tanks or other private sewage disposal systems. While the majority of these private sewage disposal systems operate successfully, there are thousands of septic tank "failures" where foul smelling, germ laden sewage is allowed to emerge to the surface of the ground, flow across adjacent land, into public streams or lakes and contaminate surface and subsurface ground water that may be used as drinking water. While many local governments have enacted legislation to regulate the construction of private sewage disposal systems, the inadvertent failure of such a system is difficult to anticipate and governmental control of such systems beyond their initial construction is virtually impossible. In many instances, a private sewage disposal system merely becomes overloaded or blocked with inorganic matter so that it discharges raw sewage before the aerobic biological decomposition of the waste matter occurs.

SUMMARY OF THE INVENTION

Briefly described, the present invention comprises a sewage treatment system wherein household waste water is treated in two stages: an aerobic biological decomposition stage, and a purifying stage. The wastewater is ducted to a septic tank or similar biological decomposing chamber where it is allowed to decompose. The wastewater is eventually ducted away from the septic tank and into a second retention chamber wherein chlorine is mixed with the wastewater. After a prolonged retention time, the wastewater with its chlorine additives is ducted away from the second retention chamber where it is allowed to flow into a field or toward a stream, etc. The chlorine additive functions to kill any bacteria, etc. flowing with the waste stream from the septic tank. The apparatus utilized to operate the system is constructed with no moving parts, and the volume of flow of the wastewater controls the quantity of chlorine additive mixed with the wastewater.

Thus, it is an object of this invention to provide a method of treating waste material carried in a household wastewater system which causes the wastewater discharged from the system to be decontaminated under virtually all conditions.

Another object of this invention is to provide apparatus for treating waste material in a household wastewater system which is inexpensive to construct, functions for prolonged time periods without attention, and which is easy to install and inspect.

Other objects, features and advantages of the present invention will become apparent upon reading the following specification, when taken in conjunction with the accompanying drawing.

BRIEF DESCRIPTION OF THE DRAWING

FIG. 1 is a side-elevational view, with parts in section, of the sewage treatment apparatus.

FIG. 2 is a partial side-elevational view of the chemical mixer.

FIG. 3 is a detailed showing of an alternate positioning tube.

DESCRIPTION OF THE PREFERRED EMBODIMENT

Referring now in more detail to the drawing, in which like numerals indicate like parts throughout the several views, FIG. 1 shows sewage treatment apparatus 10 which includes septic tank 11, retention tank 12, entrance conduit 14 to septic tank 11, connecting conduit 15 between septic tank 11 and retention tank 12, and exhaust conduit 16 leading away from retention tank 12. Entrance conduit 14 is connected to the household sewage exhaust conduit, and septic tank 11 may be of any of the conventional septic tank structures, including the forced air structure which causes the air to flow through the effluent to speed up the aerobic action. Entrance conduit 14 of septic tank 11 is positioned at a higher level than connecting conduit 15, and connecting conduit 15 is positioned at a higher level than exhaust conduit 16 of retention tank 12. Thus, the flow of wastewater through the system is from septic tank 11 through retention tank 12.

As is best shown in FIG. 2, chemical feeder 18 comprises T-shaped joint or housing 19 having its base leg 20 connected to connecting conduit 15. The downwardly extending arm 21 is substantially closed by plug or insert 22, while upwardly extending arm 24 remains open. Tubular container 25 is mounted in an upright attitude within T-shaped joint 19 with its lower end in abutment with insert 22 and its upper end projecting through upwardly extending arm 24 of T-shaped joint 19. Braces 26 connected to the exterior surface of tubular container 25 engage the inside surface of T-shaped joint 19 to maintain tubular container 25 in its upright attitude. The lower end of tubular container 25 defines a plurality of flow ports or openings 28, while the upper end is closed by cap 29.

Insert 22 of the downwardly extending arm 21 of T-shaped joint 19 defines aperture 30. Positioning tube 31 extends coaxially through tubular container 25, and its lower end projects through aperture 30. O-ring 32 surrounds positioned tube 31 above aperture 30 and disc 34 is rigidly connected to positioning tube 31. Disc 34 is sized and shaped so as to conform with the inside dimensions of tubular container 25, and support blocks 36 project radially outwardly from positioning tube 31 and are mounted above disc 34. A plurality of circular flow openings 38 are defined in positioning tube 31 above disc 34 and support blocks 36. As is best shown in FIG. 3, positioning tube 31 can define the flow openings 38a of a noncircular configuration to provide different flow characteristics, as may be desired.

Downflow tube 39 is connected at its upper end to insert 22 about positioned tube 31. As is shown in FIG. 1, downflow tube 39 extends in a downward direction toward the bottom of retention tank 12.

OPERATION

When the sewage treatment system is placed in operation, the manhole cover 13 of retention tank 12 is removed and one or more soluble cakes 40 of chlorine bearing chemical composition are placed in tubular container 25 by removing container cap 29, withdrawing positioning tube 31, and sliding the opening 41 of the annular-shaped soluble cakes about positioning tube 31 until the lower end of the lower cake abuts on support blocks 36.

Positioning tube 31 is then lowered back into tubular container 25, with its lower end being inserted through aperture 30 of insert 22. O-ring 32 is compressed between disc 34 and insert 22, about positioned tube 31 and over aperture 30, to seal insert 22. Cap 29 is then reinserted over the upper end of tubular container 25 with its central protrusion 33 extending down into the opening of positioning tube 31, which functions to center positioning tube 31 and chemical cakes 40 within tubular container 25. Manhole cover 13 is replaced, and the system is left to operate as demanded by the flowing wastewater stream.

The wastewater flows from the house into septic tank 11, where the biological decomposition of the waste material takes place in the usual manner. The effluent from septic tank 11 eventually flows through connecting conduit 15 toward retention tank 13, where it falls into downwardly extending arm 21 and insert 22 of T-shaped joint 19. The effluent builds up within insert 22 until its upper level reaches the lower ones of flow openings 38 of positioning tube 31, whereupon a flow is created through positioning tube 31 and down into downflow tube 39 toward the lower portion of retention tank 12. As the wastewater flows through openings 28 of tubular container 25, it contacts the lower portion of the lower soluble cake of chlorine bearing chemical composition, whereupon the soluble cake begins to erode and dissolve. This erosion and dissolution causes the lower portion of tubular container 25 to become a mixing chamber where the chlorine carried by the lower soluble cake 40 is mixed with the flowing effluent as it moves toward flow openings 38 of positioning tube 31. Moreover, as the effluent moves in a downward direction through the lower end of positioning tube 31 and into downflow tube 39, further mixing action between the chlorine and the effluent takes place. If the flow of wastewater toward retention tank 12 increases, the level of wastewater in tubular container 25 will rise and more of the flow openings 38 of positioning tube 31 are covered to create a larger volume of flow through the lower end of positioning tube 31. Of course, as the level of the wastewater rises, a larger surface of the lower cake 40 is immersed, which increases the rate of erosion and dissolution of the soluble cake. Thus, the increasing flow of the wastewater through positioning tube 31 causes a corresponding increase in erosion and dissolution of the soluble cakes of chlorine bearing chemical composition.

As the lower soluble cake dissipates, it and the other soluble cakes move in a downward direction through tubular container 25 under the influence of gravity so that a soluble cake is always supported by support blocks 36 and surrounds flow openings 38. Thus, as wastewater flows through chemical feeder 18, it will always contact and dissipate the lower soluble cake.

Since the wastewater flows generally across the bottom surface or annulus of the lower cake 40 from openings 28 of tubular container 25 to openings 38 of positioning tube 31, the erosion and dissolution of the lower end of the lower cake 40 will be substantially uniform under most conditions and the movement of the wastewater up through the opening 41 of the soluble cake and about the exterior portion of positioning tube 31 virtually assures that all of the wastewater will come into direct contact with the chemical composition before passing through flow openings 38.

Since support blocks 36 are located with their upper surfaces immediately adjacent the lower ones of flow openings 38, the lower end of the lower soluble cake 40 will have only a very small portion thereof immersed in or contacted by the wastewater under no flow conditions, when no wastewater is flowing through connecting conduit 15 into retention tank 13. Thus, there will be virtually no erosion or dissolution of the soluble cakes under no flow conditions.

The water level in retention tank 12 will usually be maintained at a level corresponding with the level of exhaust conduit 16, which is a level significantly higher than the level of the lower opening of downflow tube 39.

Thus, when the chlorine bearing wastewater falls from positioning tube 31 into downflow tube 39, it will fall only as far as water level 44. Of course, as more wastewater falls into downflow tube 39, the wastewater is displaced from the bottom of downflow tube 39 into the lower portion of retention tank 12. Eventually the wastewater will migrate back to water level 44 in retention tank 12 and out of exhaust conduit 16. In the meantime, the wastewater will have been retained in downflow tube 39 and subsequently in retention tank 12 for a prolonged period of time and the chlorine added to the wastewater will have killed the bacteria carried by the wastewater from septic tank 11. Thus, the wastewater flowing from exhaust conduit 16 will be substantially purified.

The chemical composition of soluble cakes 40 is such that 10 to 15 milligrams of chlorine are added to each liter of water in chemical feeder 18. The desired output from retention tank 12 is 2 milligrams of chlorine per liter of wastewater, which renders the wastewater acceptably pure for most purposes. The chlorine content of soluble cakes 40 and the binder of the soluble cakes can be adjusted, as desired, to vary the chlorine input to the wastewater.

Under normal circumstances, the waste water flowing to retention tank 12 will be substantially clear and there will be no hazard of flow openings 38 becoming clogged or blocked. If septic tank 11 malfunctions so that solids are passed through connecting conduit 15 to retention tank 12 to block flow openings 38 of positioning tube 31, the water level will rise in T-shaped joint 19 until it overflows from the upwardly extending arm 24. When the time arrives for the periodic replacement of chemical cakes 40, the operator will detect the overflow condition, which will indicate a malfunction of septic tank 11. Thus, the operator is automatically alerted. Moreover, a large surface of the soluble cakes will have been immersed and an increased amount of chlorine will have been added to the waste stream, assuring proper purification of the waste.

While the retention tank 12 has been disclosed as being in direct communication with septic tank 11 through connecting conduit 15, various other arrangements are possible. For instance, several septic tanks 11 can be connected to one or more retention tanks 12, and a chemical feeder 18 can be used for each septic tank. Also, the connection between retention tank 12 and septic tank 11 can be made by tile fields or other waste stream flow means, so that the wastewater flows through a field and is then recollected and channeled to a retention tank where the chemical feeder functions to add chlorine to the wastewater. The exhaust conduit 16 of the retention tank 12 can communicate directly with the public stream, or the like, since the wastewater will have been purified to the extent that it is not offensive and will not pollute the stream. In the situation where several septic tanks are connected to a single retention tank, the retention tank will function to retain the wastewater from several sources and mix the wastewaters together, so that if one source of wastewater is not properly treated prior to entering the retention tank, the mixture of the improperly treated wastewater with the other properly treated wastewater will function to purify all of the wastewater and guard against a single homeowner polluting a public stream by neglecting to replace his soluble cakes of chlorine bearing chemical composition.

While this invention has been described in detail with particular reference to preferred embodiments thereof, it will be understood that variations and modifications can be effected within the spirit and scope of the invention as described hereinbefore and as defined in the appended claims.

I claim:

1. Chemical mixing apparatus for use with a household waste system or the like comprising a retention tank including an inlet at its upper portion for receiving a waste stream and an outlet displaced from its bottom at an elevation below said inlet, a chemical feeder communicating with said inlet and comprising a housing substantially closed at its lower end, an upright tubular supply chamber in said housing for storing cakes of soluble chemical compound, said upright tubular supply chamber defining flow ports at its lower end and including a tubular member extending coaxially therethrough, said tubular member extending through the lower end of said housing and defining flow openings along its length to allow the waste stream to flow into said housing and through the flow ports of said upright tubular supply chamber and through the openings of said tubular member and then in a downward direction through the lower end of said housing to said retention tank.

2. The chemical mixing apparatus of claim 1 and wherein said elongated positioning tube is removably positioned concentrically within said chemical container and includes a plurality of support blocks connected thereto at the level of said flow ports of said chemical container for supporting soluble cakes of chemical composition above the flow ports of said chemical container.

3. A method of treating waste material in a household waste stream system or the like comprising:
flowing the waste stream to a first retention zone,
biologically decomposing the waste material of the waste stream in the first retention zone,
flowing the waste stream from the first retention zone to the lower end of a plurality of stacked cakes of chlorine being chemical composition of annular configuration,
progressively flowing the waste stream inwardly from around the lower stacked cake to the center of the stacked cakes, then in an upward direction through the central opening of the lower stacked cake above a predetermined level and then countercurrently in a downward direction through the central opening of the lower stacked cake to a second retention zone, and
flowing the waste stream out of the second retention zone.

4. The method of claim 3 and wherein the step of flowing the waste stream in an upward direction through the central openings of the stacked cakes of chemical composition to a predetermined level comprises flowing the waste stream to a higher level in the central openings of the stacked cakes of chemical compositions in response to an increase in the volume of flow of the waste stream.

5. The method of claim 3 and further including the step of moving the stacked cakes of chlorine bearing chemical composition in a downward direction as the lower end of the stacked cakes dissolves in the waste stream.

6. A chemical mixer for adding chlorine to household sewage or the like comprising a housing having an inlet for receiving waste water and an outlet for discharging the waste water, an upright tubular container positioned in said housing and defining flow ports at its lower end, a chemical composition positioning tube extending approximately concentrically through said tubular container and defining flow openings intermediate its ends at a level above said flow ports, said positioning tube being connected at its lower end with the outlet of said housing, and cakes of soluble chlorine bearing chemical composition of annular configuration positioned in said tubular container with their central openings surrounding said positioning tube, whereby the waste water flows through the inlet of said housing through the flow ports of said tubular container, then up between the positioning tube and the surrounding cakes of chemical composition and through the flow openings of said positioning tube, and then in a downward direction through the positioning tube and through the outlet of said housing.

7. The invention of claim 6 and further including support means connected to said positioning tube and positioned at the lower end of said tubular container and supporting the cakes of soluble chlorine bearing chemical composition generally above the level of the flow ports of said tubular container, so that as the level of waste water rises in said housing, a larger surface of the soluble chlorine bearing chemical composition becomes immersed in the waste water.

8. A chemical mixer for adding chlorine to waste water of a household sewage system or the like comprising a housing including an opening in its upper portion and an effluent inlet conduit, a tubular chemical composition holder positioned in an upright attitude within said housing and in alignment with the opening in the upper portion of said housing, a plurality of flow ports defined by said holder at its lower end for receiving the waste water, a positioning tube extending coaxially through said holder and opening through the lower portion of said housing, at least one flow opening defined in said positioning tube above the level of the flow ports of said holder, and one or more stacked cakes of soluble chlorine bearing chemical composition of annular configuration positioned in said holder with their center openings surrounding said positioning tube, whereby waste water flows through the effluent inlet conduit into said housing, through the flow ports at the lower end of said holder, in an upward direction into contact with the center openings of the cakes of soluble chlorine bearing chemical composition, through the flow opening of said positioning tube, and in a downward direction through the positioning tube and out the lower portion of said housing.

9. Chemical mixing apparatus for use with a household waste system or the like comprising a retention tank including an inlet at its upper portion for receiving a waste stream and an outlet displaced from its lower end at an elevation below said inlet, a chemical feeder in said retention tank comprising a housing having an inlet connected to the inlet of said retention tank constructed to receive all of the waste stream flowing to said retention tank, a tubular chemical container positioned in an approximately upright attitude in said housing and defining flow ports at its lower end for receiving the waste stream, an elongated positioning tube extending generally along the length of said chemical container and defining flow openings intermediate its ends within said chemical container above the level of the flow ports of said chemical container and having its lower end opening through the lower end of said housing, and a down flow tube communicating at its upper end with the lower end of said positioning tube extending from said housing in a downward direction in said retention tank to a level below the outlet of said retention tank, whereby the waste stream flowing to the inlet of said retention tank is received in said housing, passes through the flow ports of said chemical container and then in an upward direction about any chemical composition in said chemical container toward the flow openings of said positioning tube, passes in a downward direction through said positioning tube and said down flow tube to the lower portion of said retention tank, and then passes in an upward direction to the outlet of said retention tank.

References Cited

UNITED STATES PATENTS

| | | | |
|---|---|---|---|
| 3,145,087 | 8/1964 | Walker | 137—268X |
| 3,167,399 | 1/1965 | Hansen | 23—311X |
| 3,323,539 | 6/1967 | Schneider et al. | 137—268 |
| 3,327,855 | 6/1967 | Watson et al. | 210—152X |
| 3,419,146 | 12/1968 | Koulovatos | 210—152X |
| 3,469,696 | 9/1969 | Petrucci et al. | 23—272.7X |
| 3,474,817 | 10/1969 | Bates et al. | 137—268 |
| 3,487,937 | 1/1970 | Koulovatos | 210—195 |

MICHAEL ROGERS, Primary Examiner

U.S. Cl. X.R.

23—272; 137—268; 210—62, 152, 206